(12) United States Patent
Robinson et al.

(10) Patent No.: US 12,129,019 B2
(45) Date of Patent: Oct. 29, 2024

(54) AIRCRAFT AND FLOW GUIDE SYSTEM HAVING A FLOW GUIDE STRUCTURE

(71) Applicant: Robinson Aircraft ULC, Lindsay (CA)

(72) Inventors: Eric Brian Robinson, City of the Kawartha Lakes (CA); Eric Brandon Robinson, Whitby (CA); G. Kirk Creelman, Haliburton (CA)

(73) Assignee: ROBINSON AIRCRAFT ULC, Lindsay, CA (US)

( * ) Notice: Subject to any disclaimer, the term of this patent is extended or adjusted under 35 U.S.C. 154(b) by 0 days.

(21) Appl. No.: 18/164,144

(22) Filed: Feb. 3, 2023

(65) Prior Publication Data
US 2024/0262493 A1    Aug. 8, 2024

(51) Int. Cl.
*B64C 21/01*    (2023.01)
*B64C 29/00*    (2006.01)

(52) U.S. Cl.
CPC .......... *B64C 21/01* (2023.01); *B64C 29/0025* (2013.01)

(58) Field of Classification Search
CPC .......... B64C 27/20; B64C 27/22; B64C 27/26
See application file for complete search history.

(56) References Cited

U.S. PATENT DOCUMENTS

| | | | | |
|---|---|---|---|---|
| 5,454,531 A | * | 10/1995 | Melkuti | B64C 29/0025 244/12.6 |
| 8,020,804 B2 | * | 9/2011 | Yoeli | B64C 15/02 180/117 |
| 11,072,423 B1 | * | 7/2021 | Robertson | B64C 29/0025 |
| 2018/0037317 A1 | | 2/2018 | Ichihara et al. | |
| 2019/0382110 A1 | * | 12/2019 | Cottrell | B64C 27/08 |

FOREIGN PATENT DOCUMENTS

GB    2389826 A    12/2003
WO    2021004677 A1    1/2021

OTHER PUBLICATIONS

ISR & WO for PCT/CA2024/050132 dated May 3, 2024.

\* cited by examiner

*Primary Examiner* — Justin M Benedik
(74) *Attorney, Agent, or Firm* — Smart & Biggar LP (57) ABSTRACT

An aircraft and flow guide system including a flow guide structure are provided. The aircraft has an airflow generator, and a duct extending from the airflow generator to an outlet through which an airflow generated by the airflow generator is expelled. The flow guide structure is positioned towards the outlet, and has a set of flow guide surfaces defining a plurality of channels. At least some of the flow guide surfaces divert at least some of the airflow from a first direction in which the airflow travels immediately upstream of the flow guide structure towards a second direction that is orthogonal to the first direction. The flow guide structure is reorientable to cause the at least some of the flow guide surfaces to divert at least some of the airflow towards a third direction that is orthogonal to the first direction.

18 Claims, 13 Drawing Sheets

AIRCRAFT AND FLOW GUIDE SYSTEM HAVING A FLOW GUIDE STRUCTURE

FIELD

The invention relates to the field of aircraft, and, more particularly, to a flow guide structure, and an aircraft having the same.

BACKGROUND OF THE DISCLOSURE

Aircraft designed to takeoff, hover, and land vertically or substantially vertically have inspired generations of aerospace designers since Sikorsky's first helicopter took flight in September of 1939. Traditionally, these designs were limited to helicopter-type configurations that have a single large rotor, or, in some cases, two large rotors. However, with the systematic improvement in lightweight aerospace materials, battery and electric motor technology, and ducted fans, new vertical take-off and landing ("VTOL") or short take-off and landing ("STOL") designs are becoming practical.

Modern VTOL or STOL designs often leverage this new distributed thrust schema wherein lifting fans are positioned in idealized locations around or within an aircraft and are powered by electric motors connected to highly dense energy sources. These fans are often oriented so that their thrust vector is vertically or substantially vertically downward, with instances of upward thrust useful in some airfoil applications, and act by drawing air in through an inlet whereby a fan or propeller propels the air mass. The reactionary force concordantly produces a thrust vector to lift the aircraft vertically from the ground, arrest downward velocity, or otherwise produce aerodynamic balancing forces. When the aircraft is at a desired height, the aircraft may employ one or more power systems to generate forward thrust to begin moving horizontally.

One such schema that has been investigated is to place lift fans within the airfoils, canards, or body of a VTOL or STOL aircraft. This has been attempted by many leading aerospace agencies beginning in the early 1960s. However, this configuration has been historically very challenging. Many aerodynamic and structural problems manifest with high-power fans embedded and operating within the airfoils (e.g., wings, canards, and empennage) and/or fuselage of an aircraft. These problems include airflow disturbance at the fan inlets that reduce efficiency, complex pitching moments during transition to and from forward flight, high drag forces during forward flight due to the open-duct free-stream airflow interference, reduction in fan thrust nearing the ground, and other structural problems related to lift fans and their supporting architecture.

Due to recent advancements in battery, electronic control, and stabilization technologies there has been a rapid increase in the popularity of vertical take-off and landing VTOL aero-machines. A variety of designs are being proposed each vying for a foothold in a burgeoning marketplace. Each of these new designs boast some advantage over its competitors. Each new and unique VTOL design proposed has its own set of technological challenges.

Unlike conventional aircraft designs, this new breed of VTOL aircraft must operate in a flight regime that is totally foreign to a standard airplane. That is, the very low speed and hover mode.

Conventional aircraft control surfaces, which work well at high speeds, become non-functional at low speeds and new methods of stabilization and control need to be employed while the aircraft is operating at very low speeds and close to the ground.

SUMMARY OF THE DISCLOSURE

In a first aspect of the present disclosure, there is provided an aircraft, comprising: an airflow generator; a duct extending from the airflow generator to an outlet through which an airflow generated by the airflow generator is expelled; and a flow guide structure positioned towards the outlet, the flow guide structure having a set of flow guide surfaces defining a plurality of channels, at least some of the flow guide surfaces diverting at least some of the airflow from a first direction in which the airflow travels immediately upstream of the flow guide structure towards a second direction that is orthogonal to the first direction, the flow guide structure being reorientable to cause the at least some of the flow guide surfaces to divert at least some of the airflow towards a third direction that is orthogonal to the first direction.

In some or all embodiments of the first aspect, the flow guide structure is rotatable about the rotation axis to reorient the flow guide structure.

In some or all embodiments of the first aspect, the flow guide structure is disk-shaped.

In some or all embodiments of the first aspect, the flow guide structure has teeth along a circumferential surface thereof, the flow guide system further comprising: a pinion gear positioned to engage the teeth of the flow guide structure to cause the flow guide structure to rotate about the rotation axis.

In some or all embodiments of the first aspect, the flow guide structure is rotatable through 360 degrees.

In some or all embodiments of the first aspect, the channels closer to the rotation axis are smaller than channels further from the rotation axis.

In some or all embodiments of the first aspect, the at some of the flow guide surfaces is all of the flow guide surfaces.

In some or all embodiments of the first aspect, the channels are hexagonal in shape.

In some or all embodiments of the first aspect, the outlet is positioned along an airfoil of the aircraft.

In some or all embodiments of the first aspect, the airfoil is one of a wing, a canard, and an empennage.

In some or all embodiments of the first aspect, the aircraft has a first wing and a second wing, each of the first wing and the second wing having the airflow generator, the duct, and the flow guide structure.

In some or all embodiments of the first aspect, the airflow generator is a fan having a fan rotation axis, wherein the flow guide structure is positioned adjacent the fan, and the rotation axis of the flow guide structure is generally parallel to the fan rotation axis.

In some or all embodiments of the first aspect, the flow guide structure is a first flow guide structure that is positioned in a first wing of the aircraft, a second wing of the aircraft has a second flow guide structure, and the rotation axis of the flow guide structure in the first wing is substantially parallel to the rotation axis of the flow guide structure in the second wing.

In some or all embodiments of the first aspect, the flow guide structure is positioned in a wing of the aircraft, and the rotation axis of the flow guide structure is substantially normal to a major plane of the wing.

In a second aspect of the present disclosure, there is provided a flow guide system, comprising: a flow guide structure positionable towards an outlet of a flow of fluid travelling in a first direction upstream of the flow guide structure, the flow guide structure having a set of flow guide surfaces defining a plurality of channels, at least some of the flow guide surfaces diverting at least some of the flow of fluid from a first direction in which the fluid travels immediately upstream of the flow guide structure towards a second direction that is orthogonal to the first direction, the flow guide structure being reorientable to cause the at least some of the flow guide surfaces to divert at least some of the fluid towards a third direction that is orthogonal to the first direction.

In some or all embodiments of the second aspect, the flow guide structure is rotatable about the rotation axis to reorient the flow guide structure.

In some or all embodiments of the second aspect, the flow guide structure is disk-shaped.

In some or all embodiments of the second aspect, the flow guide structure has teeth along a circumferential surface thereof, the flow guide system further comprising: a pinion gear positioned to engage the teeth of the flow guide structure to cause the flow guide structure to rotate about the rotation axis.

In some or all embodiments of the second aspect, the channels closer to the rotation axis are smaller than channels further from the rotation axis.

In some or all embodiments of the second aspect, the channels are hexagonal in shape.

Other technical advantages may become readily apparent to one of ordinary skill in the art after review of the following figures and description.

BRIEF DESCRIPTIONS OF THE DRAWINGS

For a better understanding of the embodiment(s) described herein and to show more clearly how the embodiment(s) may be carried into effect, reference will now be made, by way of example only, to the accompanying drawings.

Certain examples are shown in the above-identified figures and described in detail below. In describing these examples, like or identical reference numbers are used to identify the same or similar elements. The figures are not necessarily to scale and certain features and certain views of the figures may be shown exaggerated in scale or in schematic for clarity and/or conciseness. Additionally, several examples have been described throughout this specification. Any features from any example may be included with, a replacement for, or otherwise combined with other features from other examples.

DETAILED DESCRIPTION

For simplicity and clarity of illustration, where considered appropriate, reference numerals may be repeated among the Figures to indicate corresponding or analogous elements. In addition, numerous specific details are set forth in order to provide a thorough understanding of the embodiment or embodiments described herein. However, it will be understood by those of ordinary skill in the art that the embodiments described herein may be practiced without these specific details. In other instances, well-known methods, procedures, and components have not been described in detail so as not to obscure the embodiments described herein. It should be understood at the outset that, although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described below.

Various terms used throughout the present description may be read and understood as follows, unless the context indicates otherwise: "or" as used throughout is inclusive, as though written "and/or"; singular articles and pronouns as used throughout include their plural forms, and vice versa; similarly, gendered pronouns include their counterpart pronouns so that pronouns should not be understood as limiting anything described herein to use, implementation, performance, etc. by a single gender; "exemplary" should be understood as "illustrative" or "exemplifying" and not necessarily as "preferred" over other embodiments. Further definitions for terms may be set out herein; these may apply to prior and subsequent instances of those terms, as will be understood from a reading of the present description. It will also be noted that the use of the term "a" will be understood to denote "at least one" in all instances unless explicitly stated otherwise or unless it would be understood to be obvious that it must mean "one".

Modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

The description of the mobile craft with flow guide structures that follows, and the embodiments described therein, are provided by way of illustration of an example, or examples, of particular embodiments of the principles, aspects or features of the invention. These examples are provided for the purposes of explanation, and not of limitation, of those principles and of the invention. In the description, like parts are marked throughout the specification and the drawing with the same respective reference numerals.

The terminology used in this specification is thought to be consistent with the customary and ordinary meaning of those terms as they would be understood by a person of ordinary skill in the aircraft industry in North America. The Applicant expressly excludes all interpretations that are inconsistent with this specification, and, in particular, expressly excludes any interpretation of the claims or the language used in this specification such as may be made in the USPTO, or in any other patent office, other than those interpretations for which express support can be demonstrated in this specification or in objective evidence of record, (for example, earlier publications by persons not employed by the USPTO or any other patent office), demonstrating how the terms are used and understood by persons of ordinary skill in the art, or by way of expert evidence of a person or persons of at least 10 years of experience in the aircraft industry in North America or equivalent.

In terms of general orientation and directional nomenclature, for aircraft described herein, the longitudinal or lengthwise direction is defined as being coincident with the fore- and -aft direction of flight of the aircraft in forward, straight, and level flight. In the case of a fixed airfoil aircraft, the longitudinal direction is parallel to the rolling direction of the wheeled landing gear. The leading direction, or leading edge lies toward the forward direction of travel; the rearward or trailing direction or trailing edge is oriented away from (i.e., backwards relative to) the normal direction of advance of the aircraft in forward flight. Unless otherwise noted, vertical, or upward and downward, are terms that use the landing terrain as a datum. Unless otherwise noted, "vertical" or "vertically" are intended to also include "substantially vertical" and "substantially vertically" respectively. In the context of the aircraft as a whole, the terms cross-wise, lateral, spanwise, or laterally outboard, or transverse, or transversely outboard refer to a distance or orientation perpendicular or substantially perpendicular relative to the longitudinal centreline of the fuselage. The commonly used engineering terms "proud", "flush", and "shy" may be used herein to denote items that, respectively, protrude beyond an adjacent element, are level with an adjacent element, or do not extend as far as an adjacent element, the terms corresponding conceptually to the conditions of "greater than", "equal to", and "less than".

The directions correspond generally to a Cartesian frame of reference in which the x-direction is longitudinal, the y-direction is lateral, and the z-direction is vertical. Pitching motion is angular motion of the aircraft about a horizontal axis perpendicular to the longitudinal direction. Yawing is angular motion about a vertical axis. Roll is angular motion about the longitudinal axis. Given that the aircraft described herein may tend to have a longitudinal axis of symmetry, a description of one half of the aircraft may generally also be intended to describe the other half as well, allowing for differences between right hand and left-hand parts. Also, it may be taken as a default that the basic structure of the aircraft is of aluminum fabrication with a reinforced composite surface skin, unless otherwise shown in the illustrations or indicated in the text. Other materials such as stainless steel or wood might be also used for some components.

In this discussion it may be understood that persons of ordinary skill are familiar with the aircraft construction and maintenance in North America, and may include aircraft maintenance engineers having knowledge of US Department of Transportation, Federal Aviation Administration publication EA-AC 43.13-1A & 2A "Acceptable Methods, Techniques and Practices, Aircraft Inspection and Repair", or any successor publication thereof, as updated at the date of priority filing of this specification. This specification is to be interpreted in a manner consistent with that publication.

Figure 1A:
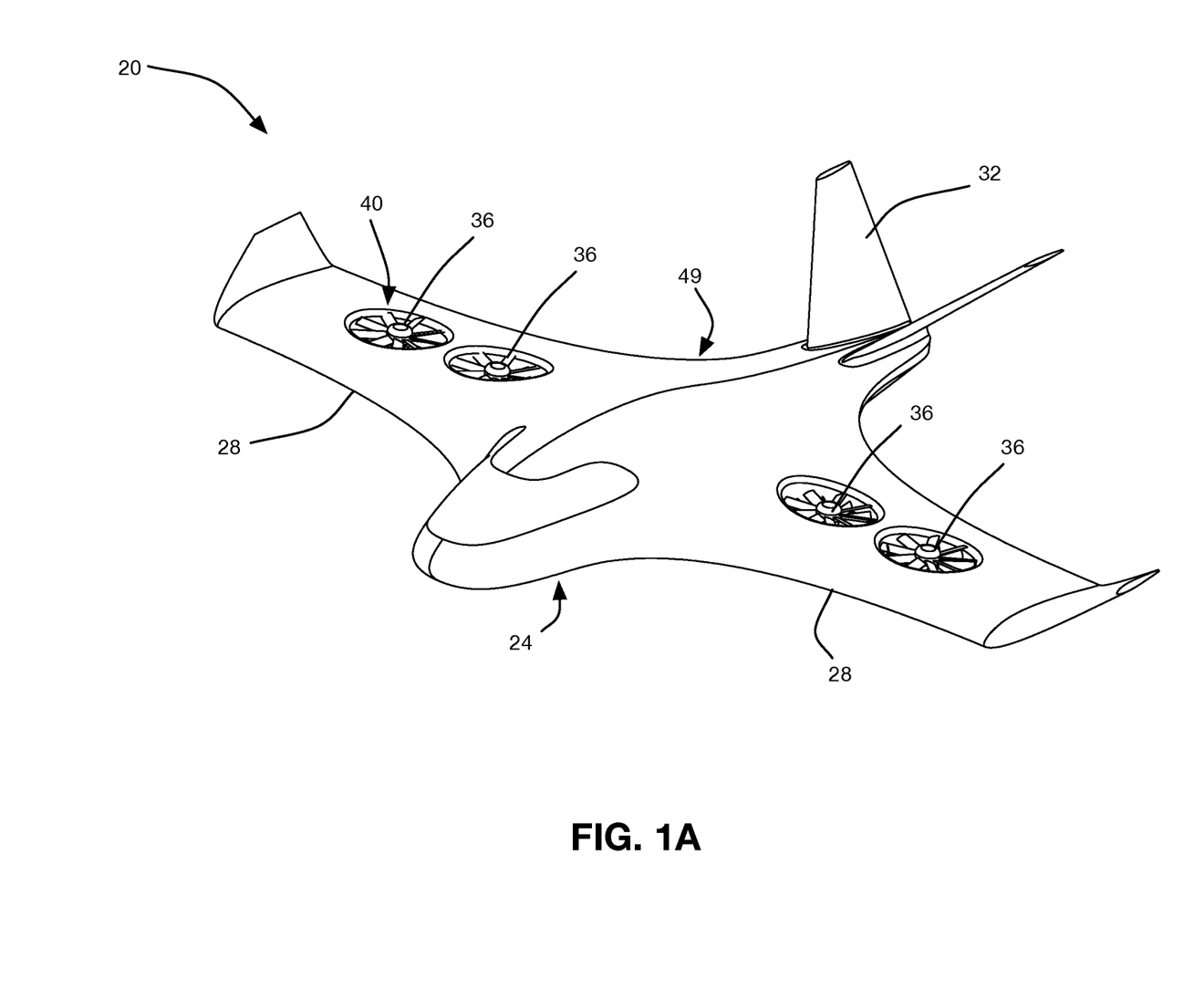
FIG. 1A is a front, top, left isometric view of a VTOL aircraft having a set of vertical thrust fans positioned in the wings thereof in accordance with an embodiment of the present disclosure.
Figure 1B:
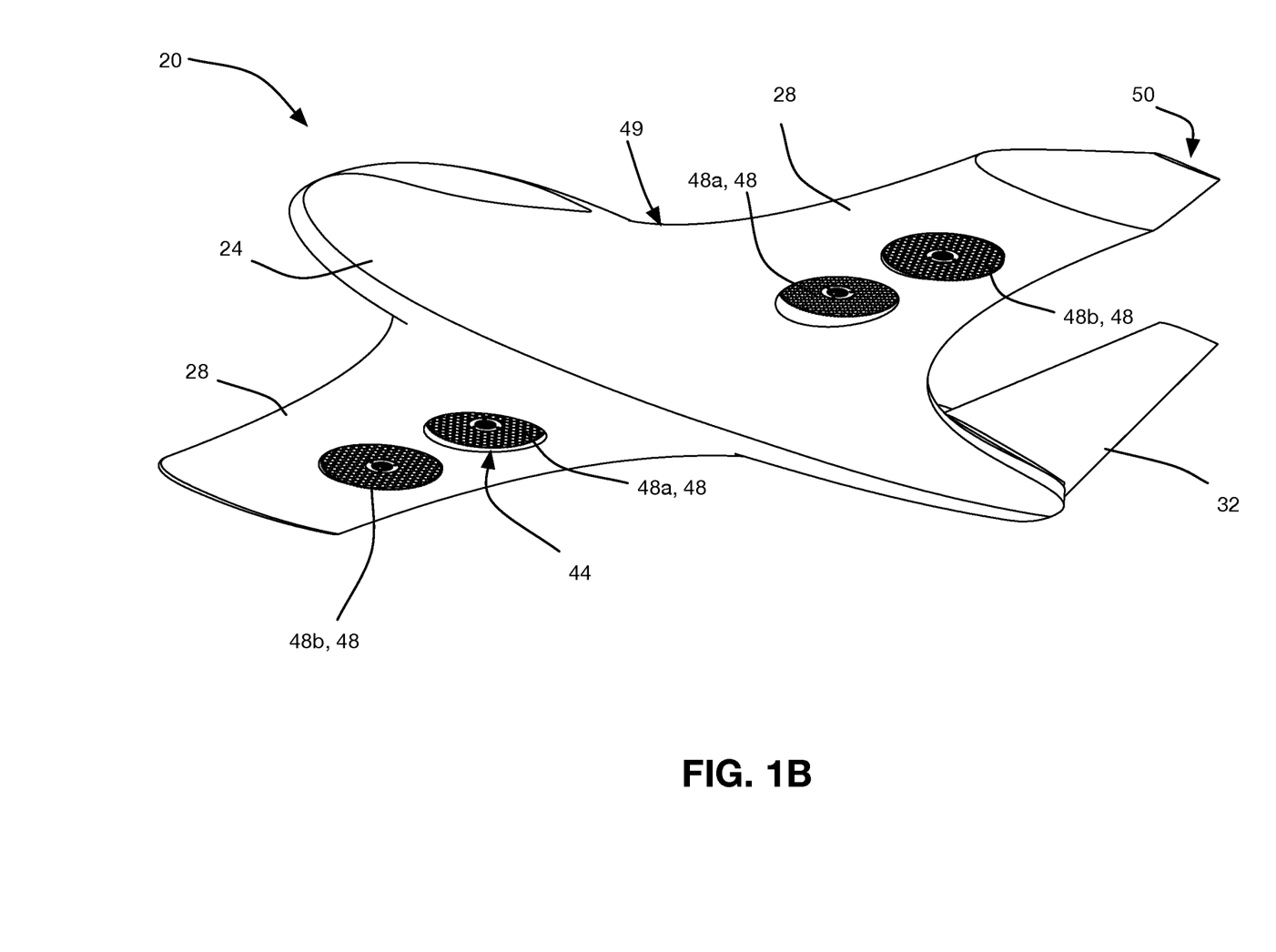
FIG. 1B is a front, bottom, left isometric view of the VTOL aircraft of FIG. 1A showing a flow guide disk positioned adjacent to the vertical thrust fans.

FIGS. 1A and 1B show an aircraft 20 in accordance with an embodiment. The aircraft 20 is a VTOL or STOL aircraft, meaning it is capable of taking off and landing vertically, substantially vertically, or using a short horizontal surface. Although principles, aspects, and features of the invention herein may be applied to other VTOL or STOL aircraft, as may be appropriate in respect to configurations wherein there are a plurality of vertically or substantially vertically thrusting fans located in the airfoils, it may be taken that in the embodiment illustrated in FIGS. 1A and 1B, the aircraft 20 is of a high-wing VTOL configuration with an airfoil optimized for efficient forward flight. The aircraft 20 has a fuselage 24, and two airfoils in the form of wings 28 extending from the fuselage 24. A tail structure connected to the fuselage 24 includes a pair of vertical stabilizers 32. The aircraft 20 can generate forward thrust via any known means, such as propellers and turbines mounted on the fuselage, wings, or tail structure.

In order to take off and/or land, the aircraft 20 includes a thrust system that generates a downward airflow. In particular, each of the wings 28 has a pair of vertical thrust fans 36 positioned along a span of the wings 28. The vertical thrust fans 36 are driven to rotate to generate vertical thrust to provide vertical thrust to the aircraft 20, typically during takeoff and landing. The wings 28 can be forward sweeping, backward sweeping, neutral in sweep, or any other suitable shape. Each vertical thrust fan 36 is positioned in a duct 40 within the corresponding wing 28 to direct the airflow generated by the vertical thrust fan 36. Each duct 40 extends from the vertical thrust fan 36 to an outlet 44 through which an airflow generated by the vertical thrust fan 36 is expelled. In this embodiment, the vertical thrust fans 36 are electric turbines, but can be any other suitable means for generating an airflow that is expelled through an outlet positioned along a lower surface of the aircraft.

Positioned downstream and adjacent to each vertical thrust fan 36, and towards the outlet 44, is a flow guide structure in the form of a flow guide disk 48. The flow guide disk 48 is a relatively thin flow guide plate that has a diameter of at least eight times its own thickness in some embodiments. It diverts at least some of the airflow from a first direction in which the airflow travels (the original efflux axis) upstream of the flow guide disk 48 to a second direction that is oblique to the first direction, yielding an overall directional change of the exhaust and thus a resulting off-axis vector. In this embodiment, the airflow generated by the vertical thrust fan 36 travels parallel to the rotation axis of the vertical thrust fan 36 prior to reaching the flow guide disk 48. In other embodiments, however, the position of the airflow generators can be moved further away from the outlet and shifted so that they are not directly above the flow guide structure. Further, the flow guide disk 48 reduces the rotational component of an existing airstream efflux and redirects the stream in a modified and controlled direction.

Along each wing 28, a first flow guide disk 48a is positioned towards a root 49 of the wing 28 and a second flow guide disk 48b is positioned towards a tip 50 of the wing 28. The flow guide disks 48a, 48b will be collectively and/or alternatively referenced as flow guide disks 48 hereinafter.

Figure 2:
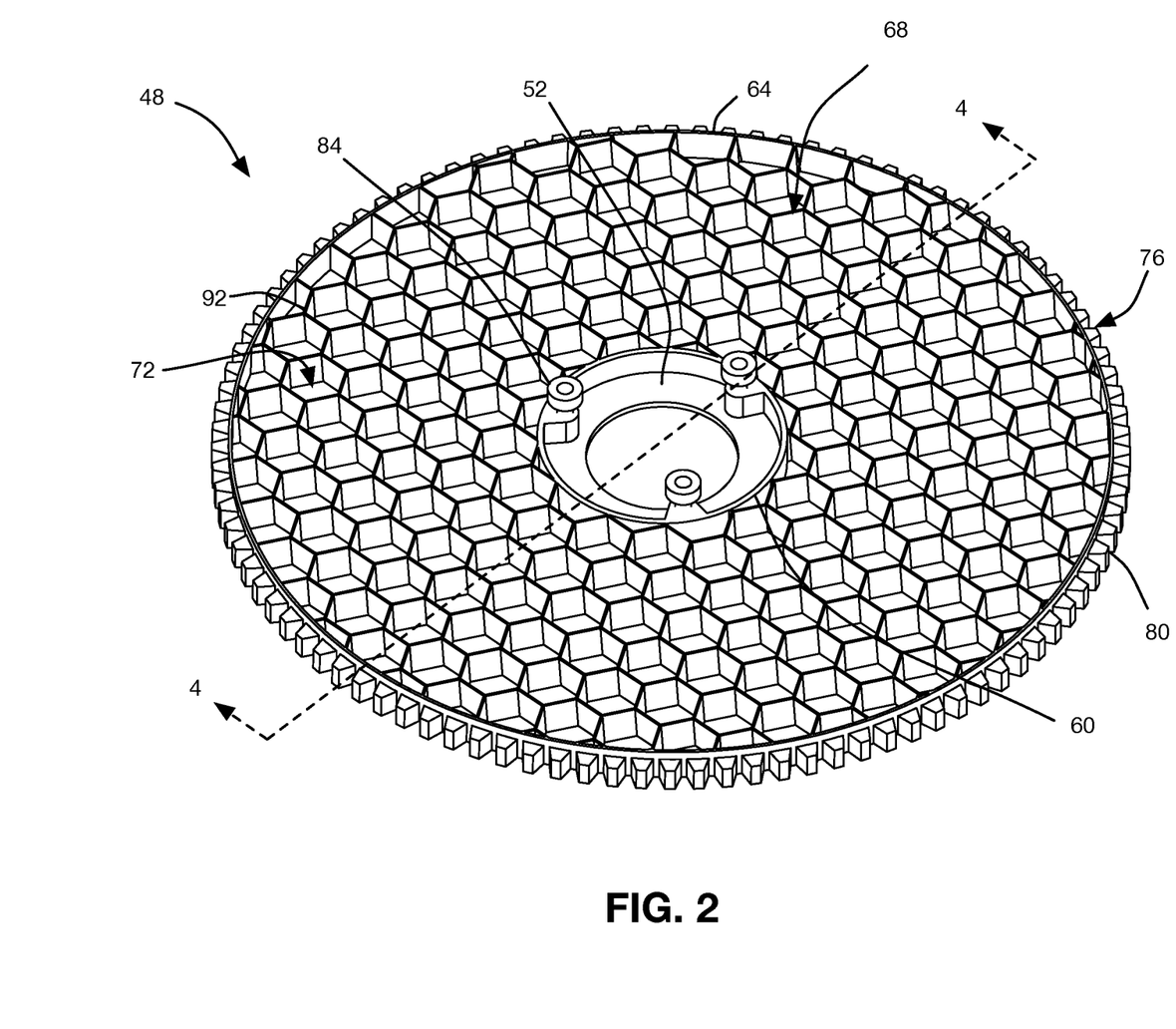
FIG. 2 is a top isometric view of a flow guide disk shown in FIGS. 1A and 1B.
Figure 3:
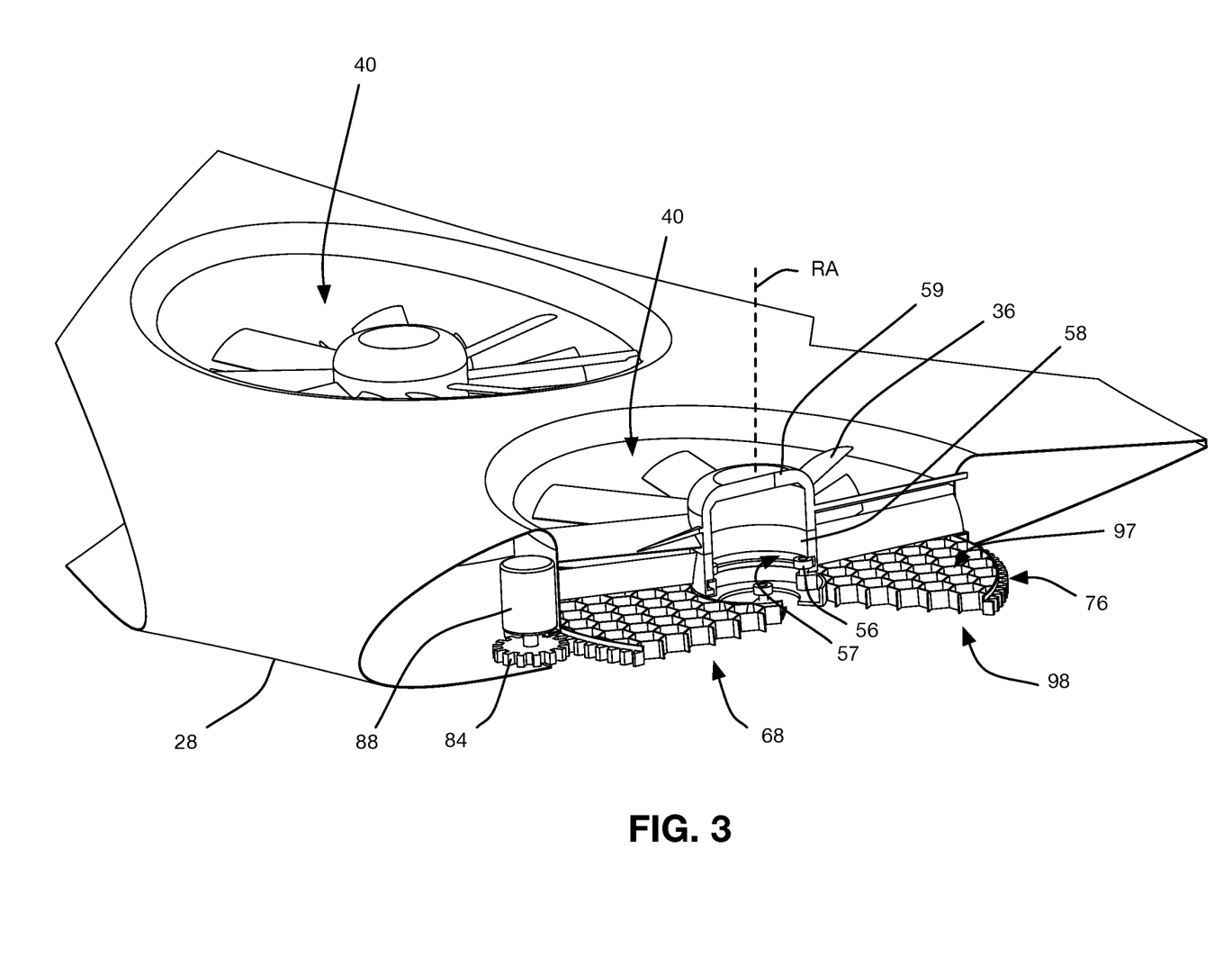
FIG. 3 is a top, front, side section view of a wing of the VTOL aircraft of FIGS. 1A and 1B showing the flow guide structure positioned adjacent to the vertical thrust fan.
Figure 4:
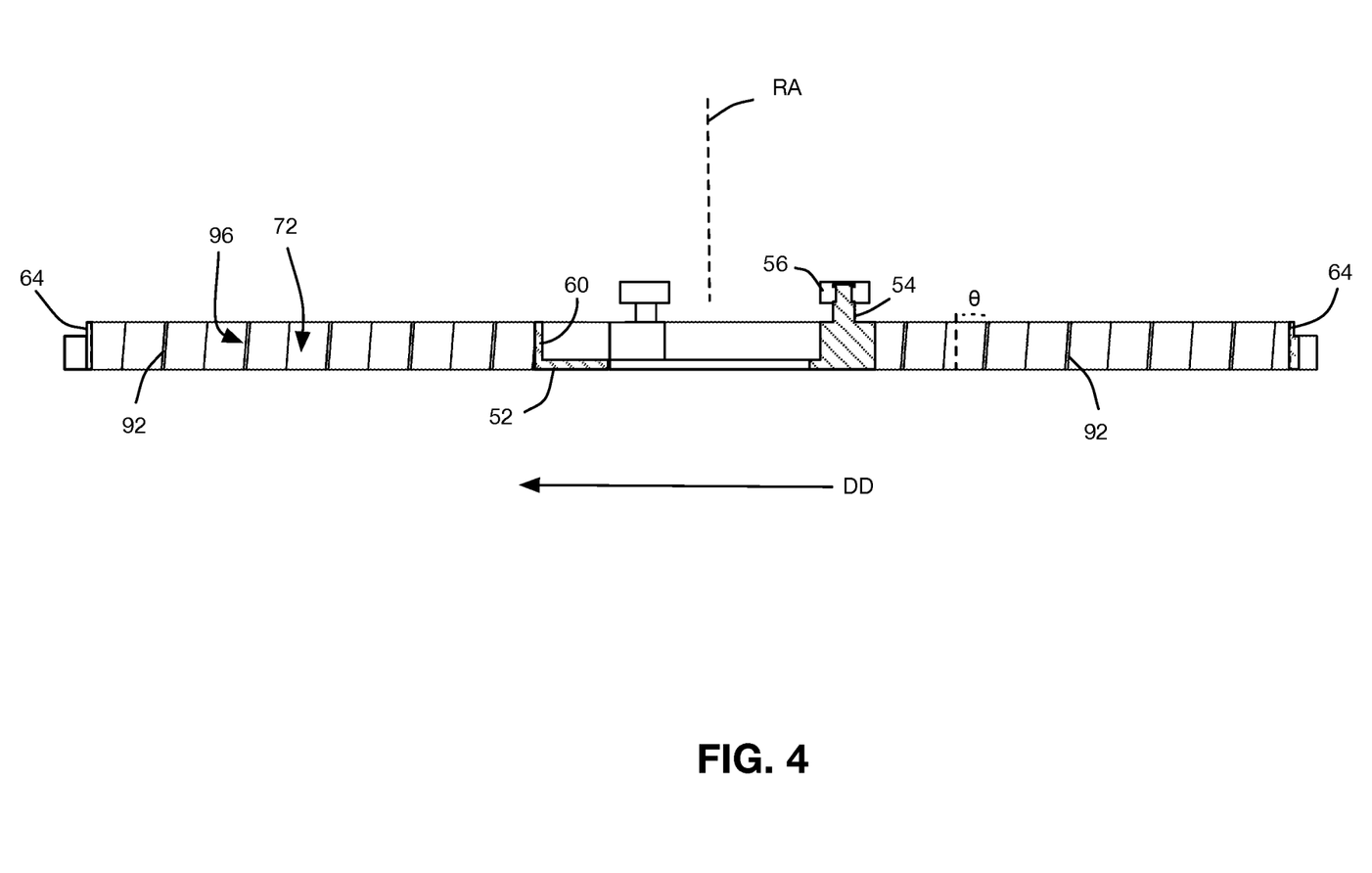
FIG. 4 shows a side section view of the flow guide structure along 4-4 in FIG. 2.

Now referring to FIGS. 2 to 4, the flow guide disk 48 is shown being generally round and having an annular coupling ring 52. The annular coupling ring 52 provides support for three bearing supports 54. Each of the bearing supports 54 support a freely rotating annular bearing 56 that is received within an inner groove 57 within a vertical thrust fan support 58 that rotatably supports a hub 59 of the corresponding vertical thrust fan 36. Alternatively, the bearings of the flow guide disk can be positioned towards its peripheral edge in other configurations.

An inner circumferential wall 60 and an outer circumferential wall 64 enclose a channel-defining (in this case, honeycomb) structure 68. The channel-defining structure 68 includes a plurality of thin walls connected together to define channels 72 that extend generally through the flow guide disk 48. A toothed peripheral surface 76 having a set of teeth 80 extends circumferentially around the outside of the outer circumferential wall 64.

A pinion gear 84 is positioned within the wing 28 to engage the toothed peripheral surface 76. A pinion shaft motor 88 drives rotation of a pinion shaft coupled to the pinion gear 84. Driving of the pinion gear 84 via the pinion shaft motor 88 causes the flow guide disk 48 to rotate about a rotation axis RA that is shared with the vertical thrust fan 36. The flow guide disk 48 does not have a limited range of rotation and is rotatable through a full 360 degrees. In other embodiments, the rotational range of the flow guide disk can be limited.

The flow guide disk 48 is positioned within the duct 40 adjacent to the vertical thrust fan 36 so that the airflow generated by the vertical thrust fan 36 passes through the channel defining structure 68. The channel-defining structure 68 has thin walls 92 that define the channels 72 that pass through the flow guide disk 48, and forms a large portion of the flow guide disks 48. The thin walls 92 of the channel-defining structure 68 reduce resistance to the airflow. The walls 92 are angled at 0 degrees relative to the rotation angle RA of the flow guide disk 48. As a result, flow guide surfaces 96 of the walls 92 deflect the airflow in a direction DD that differs from the direction in which the airflow travels immediately upstream of the flow guide disk 48; that is, generally parallel to the rotation axis RA of the flow guide disk 48. In this embodiment, the cell array of the channel-defining structure 68 is created using a straight-sided hexagon shape to improve stiffness and minimize the overall material used in the flow guide disk 48, thereby reducing its weight. The upstream inlet face of the flow guide disk 48 has a particular cell pattern. The diverter outlet face of the flow guide disk 48 has a similar matching cell pattern. The outlet pattern is skewed (translated and/or rotated) relative to the inlet face. The inlet and outlet patterns are joined by the lofted walls 92 to create the required cell tube shapes of the channels 72. The size of each flow cell is optimized for the deflection desired, and efflux velocity being directed.

Rotation of the flow guide disk 48 about the upstream flow axis, results in the redirection of the exhaust flow into an angled flow about the rotational axis RA of the flow guide disk 48. The angled exhaust flow is thus comprised of both a vertical component and a horizontal component relative to the rotational axis RA of the flow guide disk 48. The vertical component of the exhaust force provides lift to the aircraft while the horizontal component can be used to move the aircraft in rotation and translation parallel to the ground surface.

The airflow generated towards the tips of the fan blades of the vertical thrust fans 36 is greater further away from the rotation axis of the vertical thrust fans 36. The flow guide disk 48 can be designed to compensate for the radially increasing airflow. For example, the walls 92 of the channel-defining structure 68 can be less angled further from the rotation axis RA as the amount of deflection needed decreases towards the periphery of the flow guide disk 48 in order to provide more even lateral thrust across the flow guide disk 48. In another embodiment, the channels 72 of the flow guide disk 48 can be increased in size, thus further spacing apart the flow guide surfaces 96 towards the periphery of the flow guide disk 48, thereby reducing the resulting horizontal thrust towards the periphery of the flow guide disk 48.

While the channels 72 defined by the channel defining structure 68 are depicted as hexagonal in cross section in the embodiment illustrated in FIGS. 2 to 4, the cross sections of the channels provided by the channel defining structure 68 can have other shapes in other embodiments.

The skewed extruded cell shape of the channels 72 described above has two primary effects on the fan efflux. Firstly, the cells will tend to straighten any rotary or spiral motion remaining in the efflux stream. This creates a torque on the flow guide disk 48. Secondly, the entire efflux stream is bent slightly in one direction. This creates a transverse force on the flow guide disk 48, the direction of which is dependent on the rotation angle of the flow guide disk 72. Since the rotation of the flow guide disk 72 can be controlled, the resulting transverse force can be directed in any desired horizontal direction. For example, a 16-degree skewed translation between inlet and outlet cell patterns will deflect the primary stream efflux about 14 degrees away from the axial direction; that is, parallel to the rotation axis RA of the flow guide disk 48. This has the effect of reducing the vertical force slightly to 94% of the original. However, 22% of the vertical force is now available and applied in the radial direction.

Figure 7A:
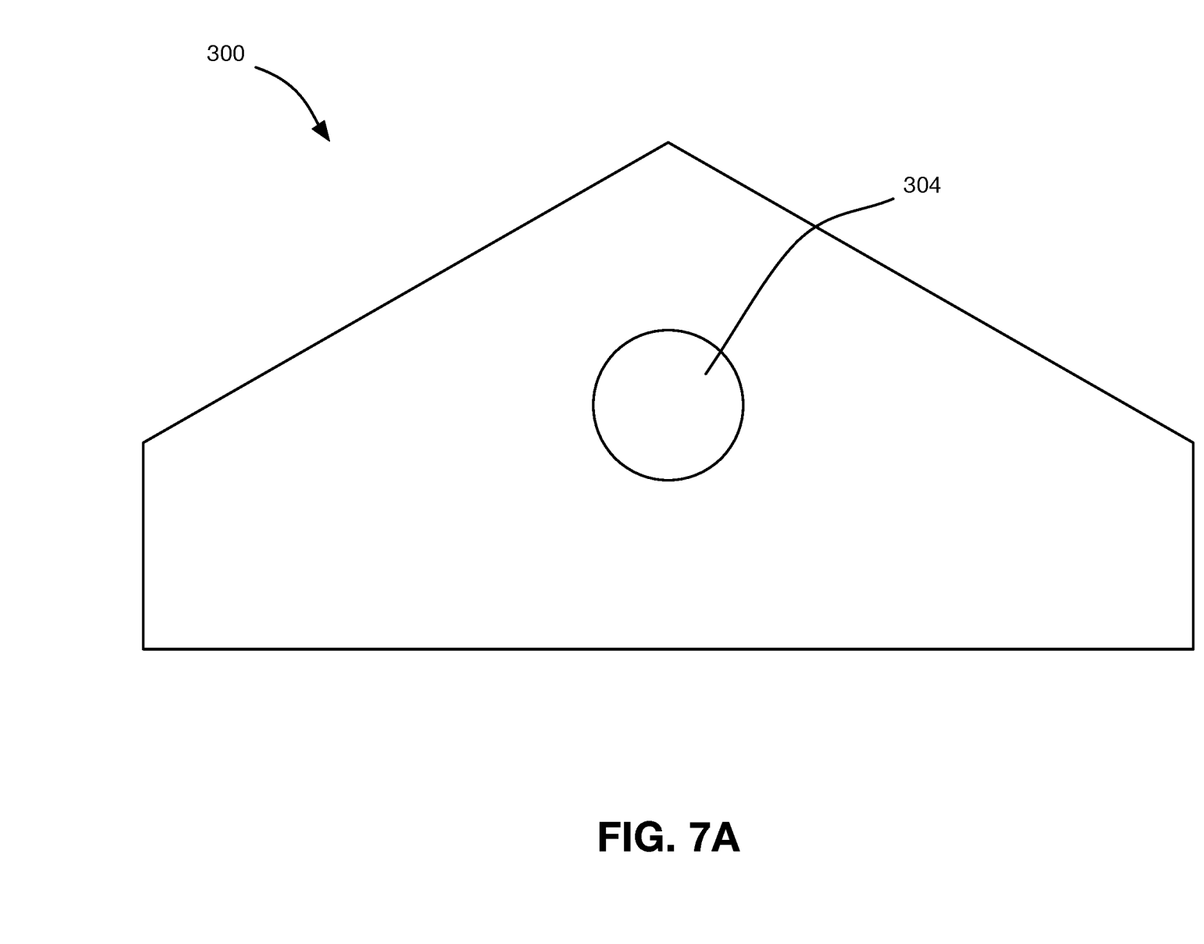
FIG. 7A is a schematic view of a bottom view of a VTOL aircraft having a vertical thrust fan positioned centrally and a flow guide structure positioned adjacent to it in accordance with still another embodiment of the present disclosure.

During vertical takeoff and landing, the vertical thrust fans 36 are used to provide vertical thrust. When the aircraft has completed vertical takeoff, and forward thrust is being generated via some type of forward propulsion system, such as one or more propellers, jets, etc., the vertical thrust fans 36 may be slowed down and ultimately turned off. In this phase of flight, the flow guide disks 48 are no longer reoriented. In some configurations, the flow guide disks may be returned to a neutral orientation as shown in FIG. 7A when the vertical thrust fans 36 are unpowered, meaning that the flow guide disks 48 will not cause the aircraft to yaw once the vertical thrust fans 36 are spun up.

The flow guide disks 48b positioned towards the tips 50 of the wings 28 work to create a net torque force vector about the vertical axis (yaw axis) of the aircraft 20.

Through the controlled and select rotation of each of the flow guide disks 48, a combination of horizontal force vectors can be directed to position the aircraft 20. The net vertical lift on each vertical thrust fan 36 remains unchanged during the rotation of the flow guide disk so that zero cross coupling of lift/side force is experienced.

Figure 5:
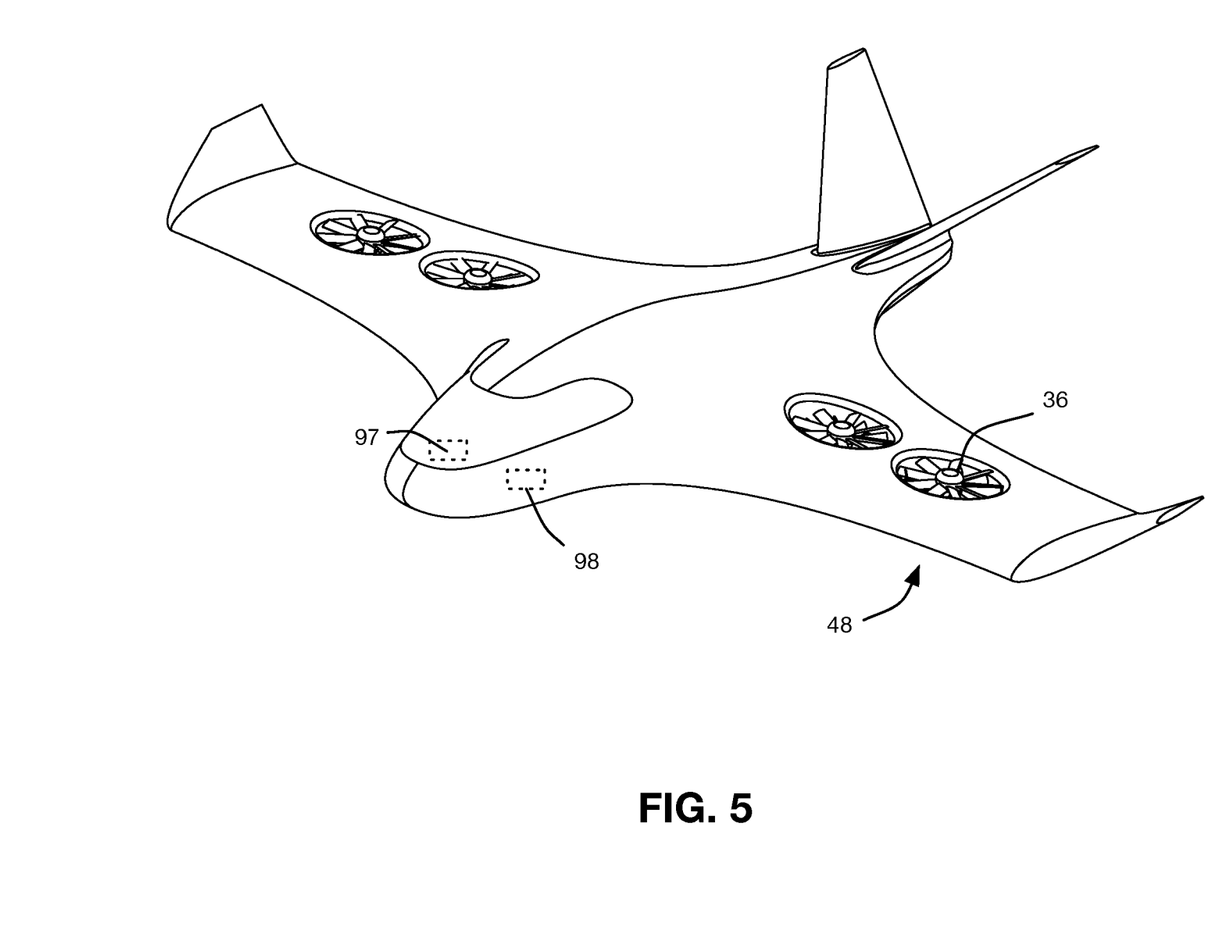
FIG. 5 shows the VTOL aircraft of FIGS. 1A and 1B having a set of controls and a control unit for effecting reorientation of the flow guide disk.

Now referring to FIG. 5 the aircraft 20 has a set of controls 97 for controlling operation of the aircraft. The set of controls 97 includes a yoke or a side or center stick, a throttle, and rudder pedals. Using the controls 97, a pilot can effect, amongst other things, vertical takeoff or landing, yaw, etc. As will be understood, the rudder pedals traditionally control yaw of the aircraft 20. When it is desired to yaw the aircraft 20 during regular forward flight, the rudder pedals cause a rudder in the empennage of the aircraft 20 to pivot. The force of the air on the rudder in its non-neutral position as the aircraft 20 is impelled forwardly causes the tail of the aircraft 20 to move right or left. When the aircraft 20 is not travelling forward with sufficient speed to generate enough force to push the tail laterally, such as when the aircraft 20 is taking off or landing vertically or substantially vertically, it can be desirable to provide yaw control in another manner. For example, the rudder pedals can be connected to a control unit 98 that, based upon the position of the rudder pedals, rotates the flow guide disks 48 to create a torquing force on the aircraft 20 to cause the aircraft 20 to rotate. The control unit 98 can be pre-configured to rotate the flow guide disks 48 according to some relationship of the rudder pedal positions, the speed of the vertical thrust fans 36, etc. In other embodiments, other controls can be used to control rotation of the flow guide disks 48.

Figure 6A:
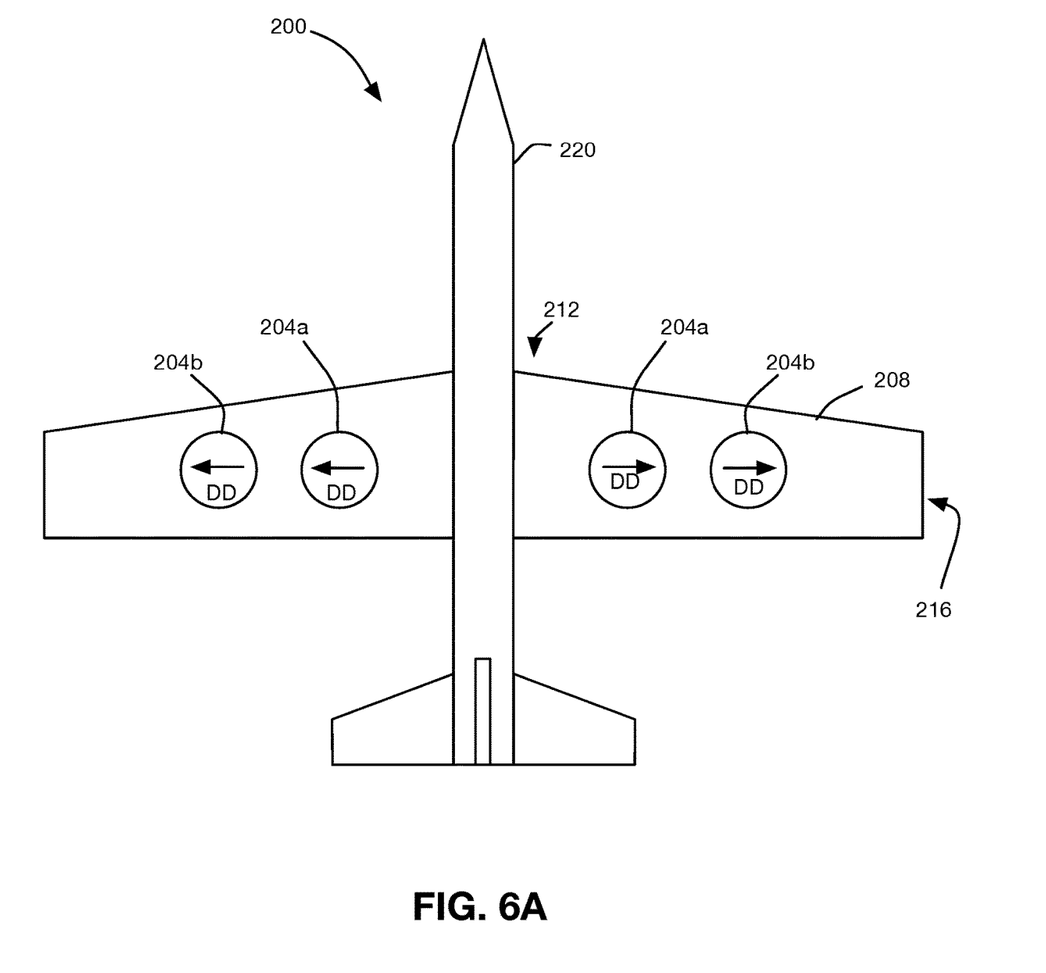
FIG. 6A is a schematic diagram showing an aircraft having two flow guide disks in each wing oriented for steady hover.

FIG. 6A shows an exemplary aircraft 200 having two vertical thrust fans and flow guide disks 204a, 204b in each of its two wings 208. A first of the vertical thrust fans and the flow guide disks 204a in each wing is positioned towards a root 212 of the wing 208, and a second of the vertical thrust fans and the flow guide disks 204b in each wing is positioned towards a tip 216 of the wing 208. During normal operation, all of the flow guide disks 204 are oriented so that the airflow is directed away from the fuselage 220, as shown by the arrows depicted atop of the flow guide structures 204. The net rotational or yaw force is zero. Although not shown, the aircraft 200 also includes horizontal thrust means for generating forward thrust. The horizontal thrust means can be any suitable means for generating forward thrust, such as one or more propellers, one or more jets, etc.

On takeoff, it is desired to blow any loose material away from the airframe to reduce the risk of foreign object ingestion by the vertical thrust fans and improve cockpit visibility. This is achieved by directing some of the airflow from the vertical thrust fans laterally away from the aircraft 200. In addition, this configuration enables airflow to be directed away from the fuselage 220 when retrieving personnel or packages using a fuselage-mounted hoist. This results in les turbulence for the sling load.

Figure 6B:
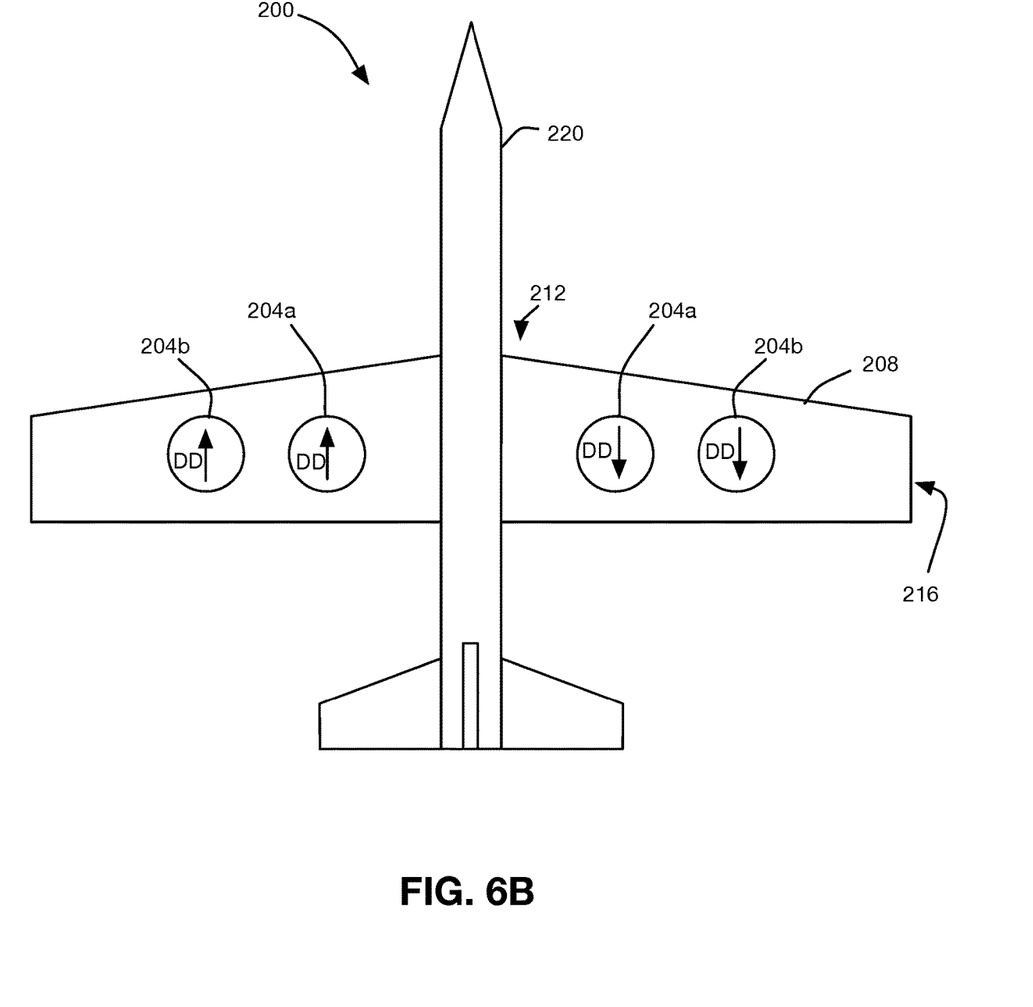
FIG. 6B shows the aircraft of FIG. 6A with the flow guide disks oriented for yaw control.
Figure 6C:
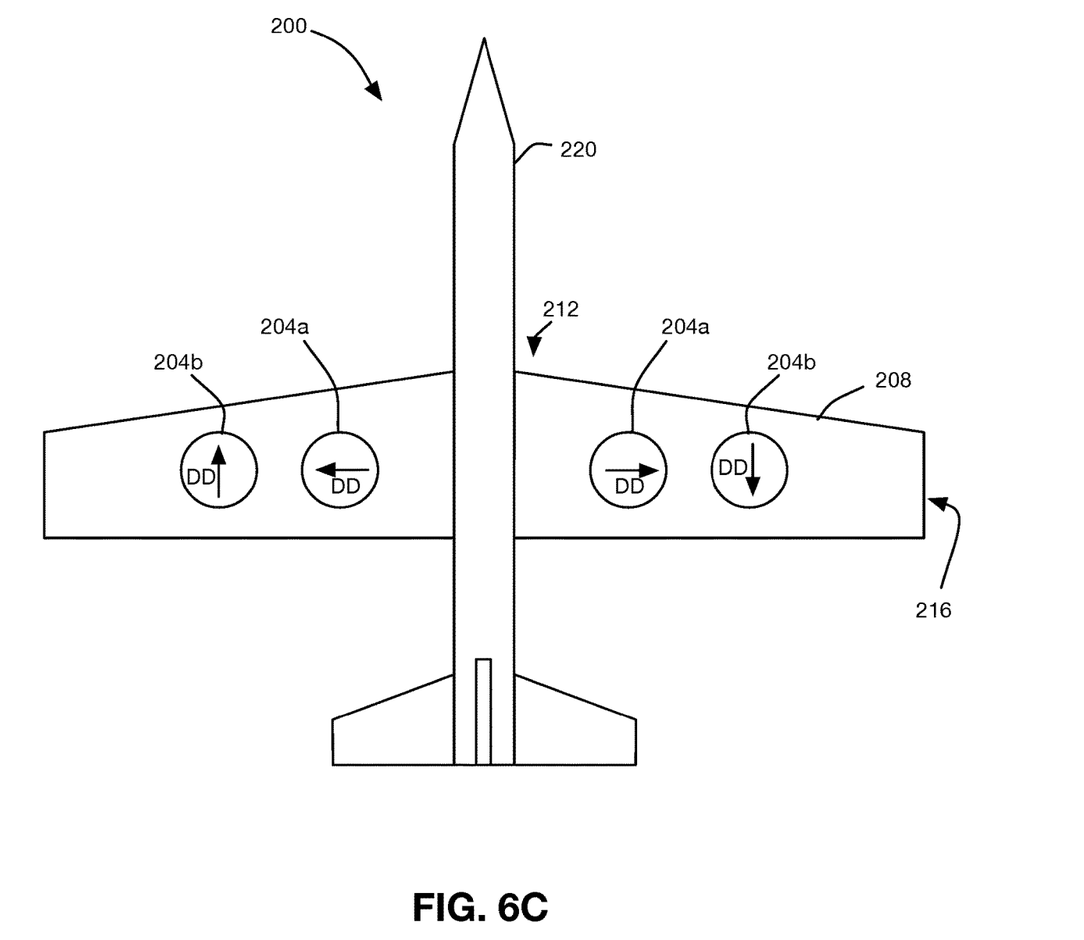
FIG. 6C shows the aircraft of FIG. 6A with the flow guide disks oriented for a smaller degree of yaw control than illustrated in FIG. 6B.

FIG. 6B shows the orientation of the flow guide disks 204 when it is desired to yaw the aircraft 200 to the left. As the flow guide disks 204 are rotated towards the positions shown in FIG. 6B from the neutral positions shown in FIG. 6A, the aircraft 200 begins to yaw to the left. This configuration is used to point the nose of the aircraft 200 in a desired direction when no wind is present and hovering. FIG. 6C shows the orientation of the flow guide disks 204 when less yaw is desired. In particular, the second flow guide disks 204b in each wing 208 are oriented to provide torquing force to the aircraft 200, and the first flow guide disks 204a are oriented for general hover, and do not contribute to the yaw provided by the second flow guide disks 204b. This yaw configuration may assist when taxiing in tight quarters—the wheel brakes are close to the centerline so significant thrust is required to turn the aircraft 200 when maneuvering on the ground at slow speeds.

Figure 6D:
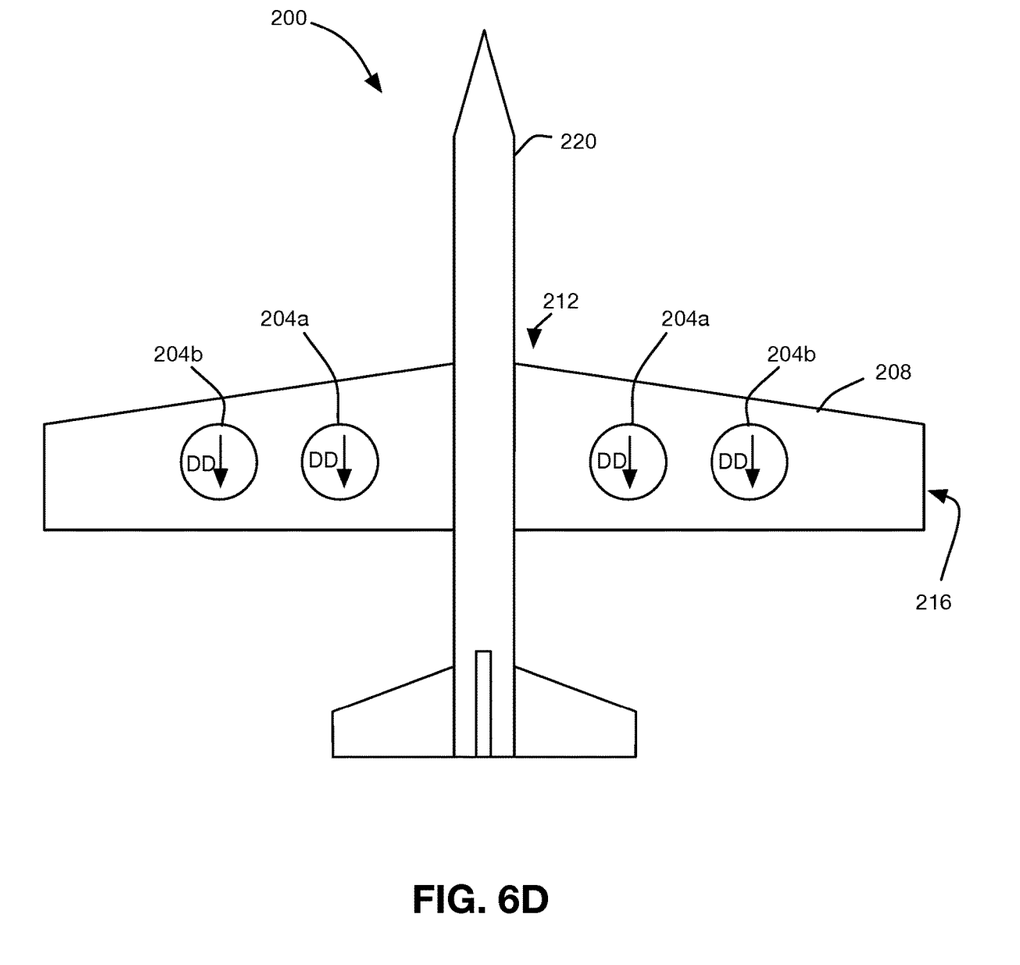
FIG. 6D shows the aircraft of FIG. 6A with the flow guide disks oriented for head wind holding and/or forward acceleration.

FIG. 6D shows the orientation of the flow guide disks 204 for forward flight and/or for countering head winds. All four flow guide disks 204a, 204b are shown oriented to direct some of the airflow from the vertical thrust fans aftwards.

Figure 6E:
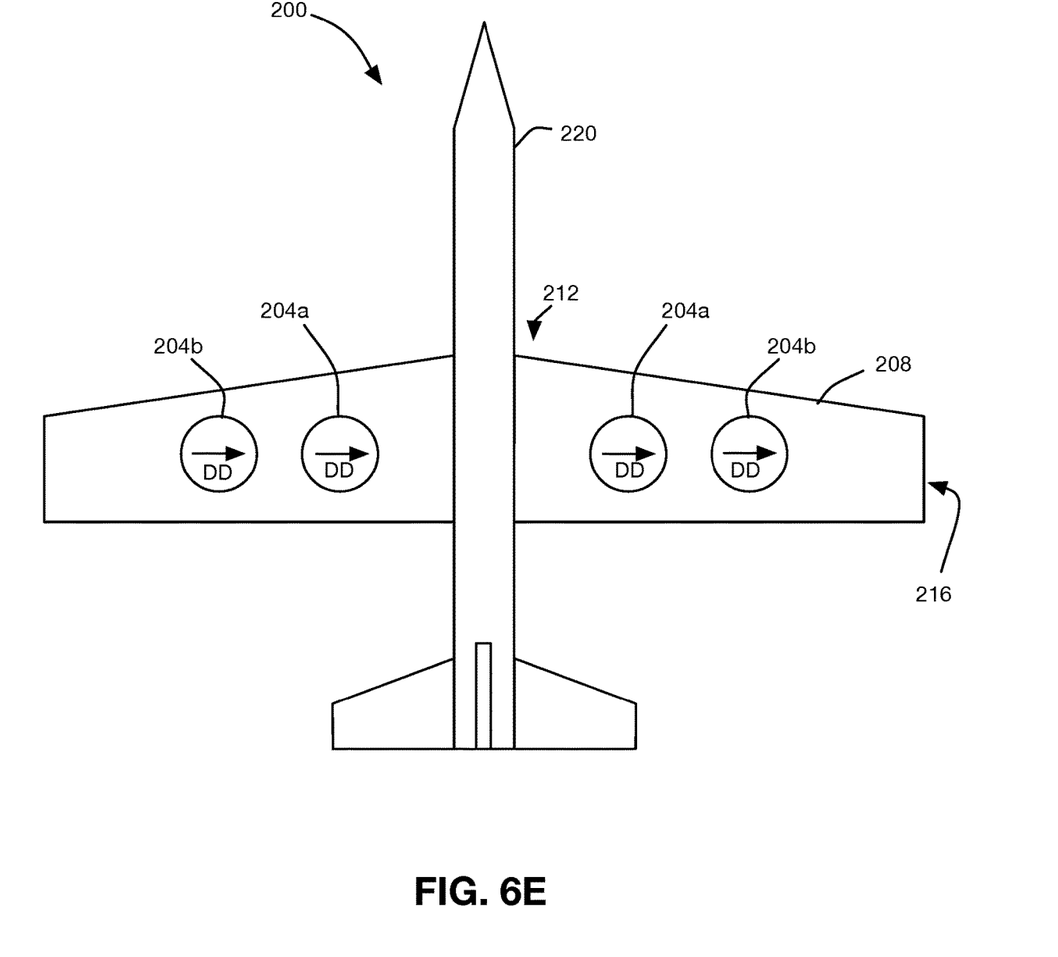
FIG. 6E shows the aircraft of FIG. 6A with the flow guide disks oriented for accommodating for a cross wind.

FIG. 6E shows the orientation of the flow guide disks 204 for countering a cross wind or for laterally translating the aircraft 200.

It will be understood that, while in the above-described embodiments in FIGS. 6A to 6E, the flow guide disks 204 are oriented in particular orientations, that other combinations of orientations can achieve similar results. Further, the flow guide disks 204a and 204b may provide differing levels of lateral redirection of the airflow generated by the vertical thrust fans via differing channel-defining structures.

FIG. 7A shows an aircraft 300 in accordance with another embodiment, wherein a vertical thrust fan and a flow guide disk 304 are positioned generally centrally in the aircraft. The flow guide disk 304 is configured to provide both the ability to translate the aircraft horizontally laterally, forwards, and backwards, and to stabilize the aircraft 300 horizontally. Although not shown, the aircraft 300 also includes horizontal thrust means for generating forward thrust. The horizontal thrust means can be any suitable means for generating forward thrust, such as one or more propellers, one or more jets, etc.

Figure 7B:
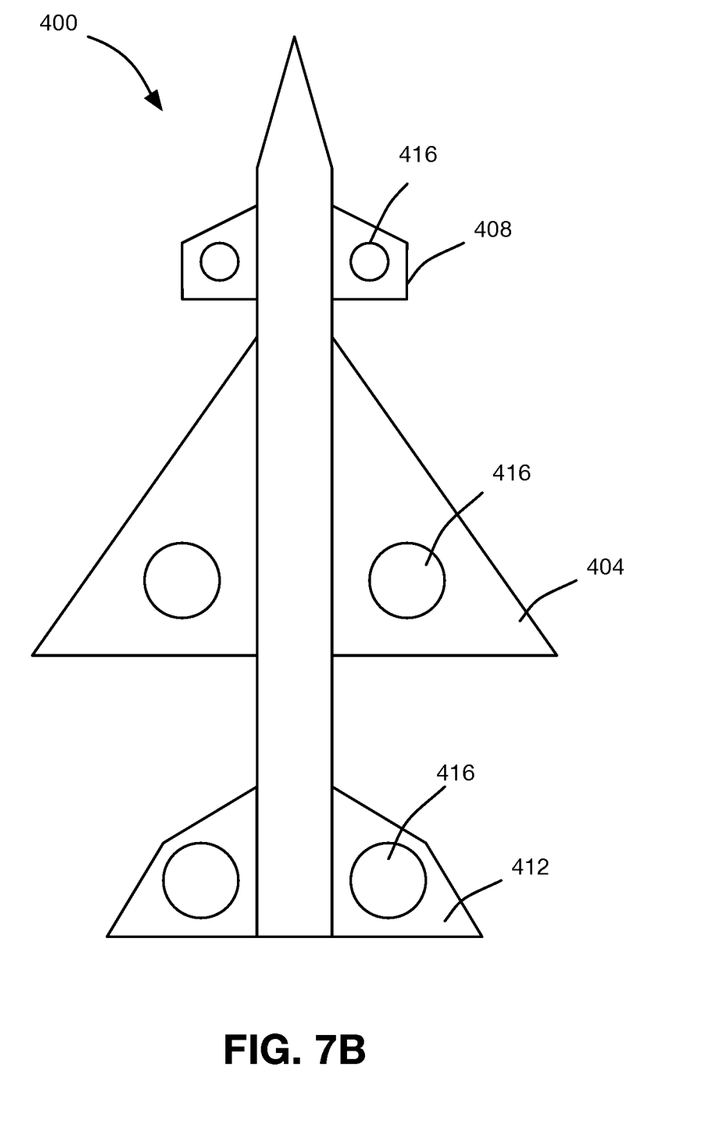
FIG. 7B is a schematic view of a bottom view of a VTOL aircraft having a vertical thrust fan and a flow guide disk positioned adjacent to it in each of the wings, canards, and horizontal stabilizers accordance with still another embodiment of the present disclosure.

FIG. 7B shows an aircraft 400 having a set of airfoils, namely a pair of wings 404, a pair of canards 408, and two horizontal stabilizers 412 forming part of the empennage of the aircraft 400. Each of the wings 404, the canards 408, and the horizontal stabilizers 412 has a vertical thrust fan and a flow guide disk 416 positioned therein. Although not shown, the aircraft 40 also includes horizontal thrust means for generating forward thrust. The horizontal thrust means can be any suitable means for generating forward thrust, such as one or more propellers, one or more jets, etc.

The flow guide disks 406 could work to control yaw or translational motion similarly. However, in order to control yaw, in the canards 408 or the empennage 412, the flow guide discs 416 would have to be coordinated (i.e., redirecting some of the airflow to one lateral side of the aircraft) whereas the flow guide disks 416 located in the main wings 404 would have to work opposite to each other in order to effect yaw due to their proximity to the center of gravity.

Furthermore, the canards and empennage diverter discs would require a degree of coordination between them (i.e., canard pairs face opposite to empennage to contribute uniformly to a clockwise or counter-clockwise rotational torque).

It is conceived that the inlet and the outlets of the vertical takeoff fans can be covered during forward flight, such as via sliding covers.

While in the above described and illustrated embodiments, the flow guide structure has been disk shaped, in other embodiments, the flow guide structure can have other forms.

In some embodiments, some or all of the flow guide structures can be fixed in orientation, or operated independently of other flow guide structures.

While it would be readily understood by a person skilled in the art, the airfoil design can be used for both manned craft and unmanned craft, such as reconnaissance aircraft.

The airfoil design disclosed herein can also be used for hydrofoils of watercraft or any other type of craft that move through a fluid. It will be appreciated that the construction of hydrofoils can be adjusted to seal some components from water ingress.

The inventive principles described and illustrated with respect to the wing of the aircraft can also be applied to other airfoils of an aircraft, such as canards and empennage.

It may be understood that the various aspects and features may be mixed and matched as may be appropriate. It may also be understood that the foregoing is not intended to be an exhaustive listing of aspects and features of the invention. These and other aspects and features of the invention may be understood with reference to the description which precedes, and with the aid of the illustrations provided.

Various embodiments have been described in detail. Since changes in, and/or additions to, the above-described examples may be made without departing from the nature, spirit, or scope of the invention, the invention is not to be limited to those details.

Although specific advantages have been enumerated above, various embodiments may include some, none, or all of the enumerated advantages.

Persons skilled in the art will appreciate that there are yet more alternative implementations and modifications possible, and that the above examples are only illustrations of one or more implementations. The scope, therefore, is only to be limited by the claims appended hereto and any amendments made thereto.

What is claimed is:

1. An aircraft, comprising:
    an airflow generator;
    a duct extending from the airflow generator to an outlet through which an airflow generated by the airflow generator is expelled; and
    a flow guide structure positioned towards the outlet, the flow guide structure having a set of flow guide surfaces defining a plurality of channels, at least some of the flow guide surfaces diverting at least some of the airflow from a first direction in which the airflow travels immediately upstream of the flow guide structure towards a second direction that is orthogonal to the first direction, the flow guide structure being rotatable about a rotation axis to cause the at least some of the flow guide surfaces to divert at least some of the airflow towards a third direction that is orthogonal to the first direction, the third direction being orthogonal or oblique to the second direction.

2. The aircraft of claim 1, wherein the flow guide structure is disk-shaped.

3. The aircraft of claim 2, wherein the flow guide structure has teeth along a circumferential surface thereof, the flow guide system further comprising:
    a pinion gear positioned to engage the teeth of the flow guide structure to cause the flow guide structure to rotate about the rotation axis.

4. The aircraft of claim 3, wherein the flow guide structure is rotatable through 360 degrees.

5. The aircraft of claim 1, wherein the channels closer to the rotation axis are smaller than channels further from the rotation axis.

6. The aircraft of claim 1, wherein the at some of the flow guide surfaces is all of the flow guide surfaces.

7. The aircraft of claim 1, wherein the channels are hexagonal in shape.

8. The aircraft of claim 1, wherein the outlet is positioned along an airfoil of the aircraft.

9. The aircraft of claim 8, wherein the airfoil is one of a wing, a canard, and an empennage.

10. The aircraft of claim 8, wherein the aircraft has a first wing and a second wing, each of the first wing and the second wing having the airflow generator, the duct, and the flow guide structure.

11. The aircraft of claim 2, wherein the airflow generator is a fan having a fan rotation axis, wherein the flow guide structure is positioned adjacent the fan, and wherein the rotation axis of the flow guide structure is generally parallel to the fan rotation axis.

12. The aircraft of claim 11, wherein the flow guide structure is a first flow guide structure that is positioned in a first wing of the aircraft, wherein a second wing of the aircraft has a second flow guide structure, and wherein the rotation axis of the flow guide structure in the first wing is substantially parallel to the rotation axis of the flow guide structure in the second wing.

13. The aircraft of claim 11, wherein the flow guide structure is positioned in a wing of the aircraft, and wherein the rotation axis of the flow guide structure is substantially normal to a major plane of the wing.

14. A flow guide system, comprising:
    a flow guide structure positionable towards an outlet of a flow of fluid travelling in a first direction upstream of the flow guide structure, the flow guide structure having a set of flow guide surfaces defining a plurality of channels, at least some of the flow guide surfaces diverting at least some of the flow of fluid from a first direction in which the fluid travels immediately upstream of the flow guide structure towards a second direction that is orthogonal to the first direction, the flow guide structure being rotatable about a rotation axis to cause the at least some of the flow guide surfaces to divert at least some of the fluid towards a third direction that is orthogonal to the first direction, the third direction being orthogonal or oblique to the second direction.

15. The flow guide system of claim 14, wherein the flow guide structure is disk-shaped.

16. The flow guide system of claim 15, wherein the flow guide structure has teeth along a circumferential surface thereof, the flow guide system further comprising:
    a pinion gear positioned to engage the teeth of the flow guide structure to cause the flow guide structure to rotate about the rotation axis.

17. The flow guide system of claim 14, wherein the channels closer to the rotation axis are smaller than channels further from the rotation axis.

18. The flow guide system of claim 14, wherein the channels are hexagonal in shape.

* * * * *